United States Patent
Chen

(10) Patent No.: US 11,617,177 B2
(45) Date of Patent: Mar. 28, 2023

(54) BEAM FAILURE RECOVERY METHOD AND TERMINAL

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 89 days.

(21) Appl. No.: 16/963,033

(22) PCT Filed: Jan. 16, 2019

(86) PCT No.: PCT/CN2019/071945
§ 371 (c)(1),
(2) Date: Jul. 17, 2020

(87) PCT Pub. No.: WO2019/141182
PCT Pub. Date: Jul. 25, 2019

(65) Prior Publication Data
US 2020/0351860 A1     Nov. 5, 2020

(30) Foreign Application Priority Data

Jan. 19, 2018  (CN) .......................... 201810053479.3

(51) Int. Cl.
*H04W 72/04*     (2009.01)
*H04W 72/044*    (2023.01)
*H04W 74/08*     (2009.01)

(52) U.S. Cl.
CPC ..... *H04W 72/046* (2013.01); *H04W 74/0833* (2013.01)

(58) Field of Classification Search
CPC ........... H04W 72/046; H04W 74/0833; H04W 76/19; H04W 72/085; H04W 74/0866; H04W 74/02; H04W 76/18; H04B 7/0695; H04B 7/088
See application file for complete search history.

(56) References Cited

U.S. PATENT DOCUMENTS

| | | | |
|---|---|---|---|
| 2018/0006770 A1 | 1/2018 | Guo et al. | |
| 2019/0053313 A1* | 2/2019 | Zhou | H04W 52/146 |
| 2019/0075014 A1* | 3/2019 | Zhou | H04W 72/042 |

(Continued)

FOREIGN PATENT DOCUMENTS

| | | |
|---|---|---|
| CN | 106374984 A | 2/2017 |
| CN | 107342801 A | 11/2017 |

(Continued)

OTHER PUBLICATIONS

European Search Report related to PCT Application No. PCT/CN2019071945 dated Feb. 2, 2021.

(Continued)

*Primary Examiner* — Thai Nguyen
(74) *Attorney, Agent, or Firm* — von Briesen & Roper, s.c.

(57) ABSTRACT

A beam failure recovery method and a terminal are provided. The method is applied to a media access control (MAC) layer of the terminal, and includes: processing a random access procedure in accordance with a preset processing manner, when obtaining a new candidate beam during the random access procedure of transmitting a beam failure recovery request.

20 Claims, 2 Drawing Sheets

--- when obtaining at least two candidate beams used to transmit a beam failure recovery request during a beam failure recovery procedure, selecting a beam from the at least two candidate beams to transmit the beam failure recovery request; or selecting part or all of the at least two candidate beams to transmit the beam failure recovery request in a predetermined order ─ 31

(56) References Cited

U.S. PATENT DOCUMENTS

| | | | |
|---|---|---|---|
| 2019/0306765 A1* | 10/2019 | Cirik | H04W 36/0058 |
| 2020/0044723 A1* | 2/2020 | Cirik | H04W 72/0453 |
| 2020/0137821 A1* | 4/2020 | Cirik | H04B 7/063 |

FOREIGN PATENT DOCUMENTS

| | | | | |
|---|---|---|---|---|
| CN | 107567038 A | | 1/2018 | |
| WO | WO-2017024516 A1 | * | 2/2017 | H04B 7/0695 |
| WO | WO 2017/054249 A1 | | 4/2017 | |
| WO | WO-2018009462 A1 | * | 1/2018 | |
| WO | WO-2019096394 A1 | * | 5/2019 | |

OTHER PUBLICATIONS

Sharp, (Discussion on mechanisms for beam failure recovery); 3GPP TSG RAN WG1 Meeting #91; Reno, Nevada, USA, Nov. 27-Dec. 1, 2017; R1-1720613; pp. 1-6.

Ericsson, (Remaining details and corrections for beam recovery); 3GPP TSG RAN WG1 Meeting AH 1801; Vancouver, Canada, Jan. 22-26, 2018; R1-1800700; pp. 1-10.

Samsung, (RAN1 agreements based beam recover procedure); 3GPP TSG-RAN WG2 2017 RAN2#100 Meeting Reno, USA, Nov. 27-29, 2017; R2-1713797; pp. 1-4.

ZTE Corporation, Sanechips, (Discussion on the beam failure recovery impact on RAN2); 3GPP TSG-RAN WG2 Meeting #100; Reno, USA, Nov. 27-Dec. 1, 2017; R2-1713954; pp. 1-14.

AT&T, (Impact of beam failure and recovery on RLM procedures); 3GPP TSG-RAN WG2 NR Ad hoc 1801; Vancouver, Canada, Jan. 22-Jan. 26, 2018; R2-1801215; pp. 1-4.

Chinese First Office Action Application No. 201810053479.3; dated Oct. 23, 2020.

International Search Report & Written Opinion related to Application No. PCT/CN2019/071946; dated Apr. 8, 2019.

VIVO; "Clarification on beam failure recovery and text proposal", 3GPP TSG-RAN WG2 NR Ad hoc 1801: R2-1800867, Vancouver, Canada, Jan. 22, 2018-Jan. 26, 2018.

Nokia.; "TP on beam recovery", 3GPP TSG-RAN WG2 #100; R2-1714047, Reno, USA, Nov. 27, 2017-Dec. 1, 2017.

* cited by examiner processing a random access procedure according to a preset processing manner, when obtaining a new candidate beam during the random access procedure of transmitting a beam failure recovery request — 11

FIG. 1

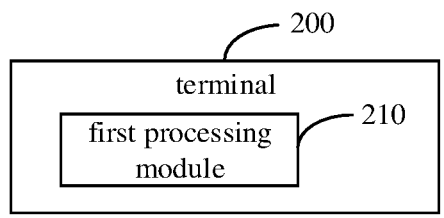

FIG. 2 when obtaining at least two candidate beams used to transmit a beam failure recovery request during a beam failure recovery procedure, selecting a beam from the at least two candidate beams to transmit the beam failure recovery request; or selecting part or all of the at least two candidate beams to transmit the beam failure recovery request in a predetermined order — 31

FIG. 3

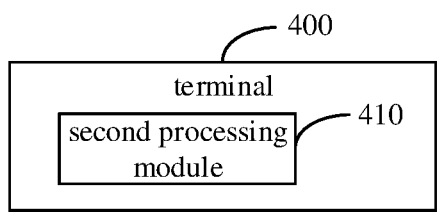

FIG. 4

BEAM FAILURE RECOVERY METHOD AND TERMINAL

CROSS-REFERENCE TO RELATED APPLICATION

This patent application is a 35 USC § 371 U.S. national stage of International Application No. PCT/CN2019/071945 filed on Jan. 16, 2019, which claims a priority to Chinese Patent Application No. 201810053479.3 filed on Jan. 19, 2018, both of which are incorporated in their entireties by reference herein.

TECHNICAL FIELD

The present disclosure relates to the field of communication technology, in particular to a beam failure recovery method and a terminal.

BACKGROUND

In the future $5^{th}$ Generation (5G) mobile communication systems, high-frequency communication and large-scale antenna technology will be introduced, in order to achieve a downlink transmission rate of 20 Gbps and an uplink transmission rate of 10 Gbps. The high-frequency communication can provide wider system bandwidth, and the antenna size can also be smaller, which is more conducive to the deployment of large-scale antennas in network devices and terminals. The high-frequency communication has disadvantages of a large pathloss, susceptibility to interference, and vulnerability of links, while the large-scale antenna technology can provide a large antenna gain. Therefore, a combination of the high-frequency communication and the large-scale antenna is an inexorable trend of the future 5G mobile communication systems. However, not all the problems of the high-frequency communication can be solved by adopting the large-scale antenna technology, such as the vulnerability of links. When blockage is encountered in high-frequency communication, beam switch can be quickly performed based on a beam failure recovery mechanism, and a communication link is switched from a poor beam to a better beam, to avoid radio link failure, which can effectively improve the robustness of links.

Current beam failure recovery mechanisms include: beam failure detection, new candidate beam identification, transmitting a beam failure recovery request, a terminal monitoring a beam failure recovery response from a network-side, and other procedures. The new candidate beam identification may be before the beam failure detection or after the beam failure detection. The beam failure recovery request may be transmitted in the following manners. The beam failure recovery request transmission based on contention-free physical random access channel (PRACH) is supported, where a resource of the PRACH used to transmit the beam failure recovery request is orthogonal to a resource of a normal PRACH, and frequency division multiplexing is at least supported. The beam failure recovery request transmission based on Physical Uplink Control Channel (PUCCH) is supported. Optionally, the beam failure recovery request is transmitted based on contention-free PRACH with contention-based PRACH as supplementary, where contention-based PRACH resources are from a traditional RACH resource pool, and 4-step RACH procedures are adopted.

When the Media Access Control (MAC) layer of a terminal receives a beam failure recovery indication from a physical (PHY) layer, the RACH procedure is triggered to transmit a beam failure recovery request. During this procedure, if a new candidate beam indicated by the PHY layer is received, the terminal cannot determine how to deal with it, which may cause a failure to the beam failure recovery.

SUMMARY

Embodiments of the present disclosure provide a beam failure recovery method and a terminal, so as to solve a problem that the terminal cannot determine a processing mechanism when a new candidate beam is indicated during a procedure of beam failure recovery request transmission.

In a first aspect, embodiments of the present disclosure provide a beam failure recovery method, which is applied to a media access control (MAC) layer of a terminal and includes: processing a random access procedure in accordance with a preset processing manner, when obtaining a new candidate beam during the random access procedure of transmitting a beam failure recovery request.

In a second aspect, embodiments of the present disclosure further provide a terminal, which includes: a first processing module, configured to process a random access procedure in accordance with a preset processing manner, when obtaining a new candidate beam during the random access procedure of transmitting a beam failure recovery request.

In a third aspect, embodiments of the present disclosure further provide a beam failure recovery method, which is applied to a media access control (MAC) layer of a terminal and includes: when obtaining at least two candidate beams used to transmit a beam failure recovery request during a beam failure recovery procedure, selecting a beam from the at least two candidate beams to transmit the beam failure recovery request; or selecting part or all of the at least two candidate beams to transmit the beam failure recovery request in a predetermined order.

In a fourth aspect, embodiments of the present disclosure provide a terminal, including a second processing module configured to: when obtaining at least two candidate beams used to transmit a beam failure recovery request during a beam failure recovery procedure, select a beam from the at least two candidate beams to transmit the beam failure recovery request; or select part or all of the at least two candidate beams to transmit the beam failure recovery request in a predetermined order.

In a fifth aspect, embodiments of the present disclosure provide a terminal. The terminal includes a processor, a memory, and a program stored on the memory and executable on the processor. When executing the program, the processor is configured to implement steps of the above beam failure recovery method.

In a sixth aspect, embodiments of the present disclosure further provides a computer-readable storage medium, on which a program is stored. The program is executed by a processor to implement steps of the above beam failure recovery method.

In this way, based on the beam failure recovery method and the terminal in the embodiments of the present disclosure, when obtaining a new candidate beam during a random access procedure of transmitting a beam failure recovery request, a MAC layer of a terminal process the random access procedure in accordance with a preset processing manner, thereby ensuring that the beam failure recovery is completed as soon as possible and ensuring normal data transmission between the terminal and a network device.

BRIEF DESCRIPTION OF THE DRAWINGS

In order to more clearly explain technical solutions of embodiments of the present disclosure, drawings used in description of the embodiments of the present disclosure will be briefly described below. It is obvious that the drawings in the following description are only a part, rather than all, of the embodiments of the present disclosure, and those of ordinary skill in the art may obtain other drawings based on these drawings without paying creative efforts.

FIG. 1 is a schematic flowchart of a beam failure recovery method according to a first embodiment of the present disclosure;

FIG. 2 shows a schematic diagram of a module structure of a terminal according to the first embodiment of the present disclosure;

FIG. 3 is a schematic flowchart of a beam failure recovery method according to a second embodiment of the present disclosure;

FIG. 4 is a schematic diagram of a module structure of a terminal according to the second embodiment of the present disclosure.

DETAILED DESCRIPTION

Figure 5:
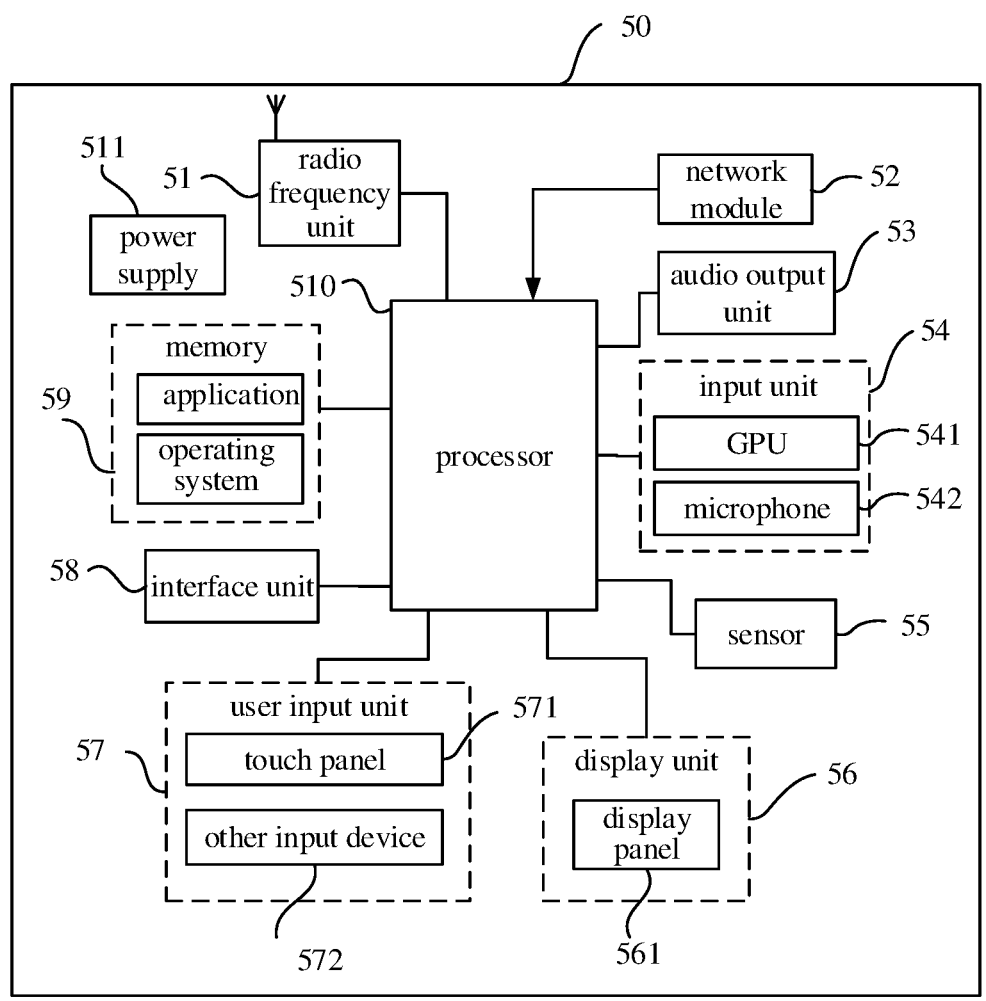
FIG. 5 is a block diagram of a terminal according to embodiments of the present disclosure.

Exemplary embodiments of the present disclosure will be described below in more detail with reference to the accompanying drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to those skilled in the art.

Such terms as "first", "second" in the specification and claims of the present disclosure are used to distinguish similar objects without having to describe a particular order or sequence. It should be understood that data used in this manner may be interchangeable where appropriate so that the embodiments of the present application described herein can be implemented, for example, in a sequence other than those illustrated or described herein. Furthermore, such terms as "including" and "having" and any variant thereof are intended to cover non-exclusive inclusion, for example, processes, methods, systems, products or devices that include a series of steps or units are not necessarily limited to those clearly listed, but may include other steps or units that are not clearly listed or inherent to these processes, methods, products or devices.

First Embodiment

As shown in FIG. 1, an embodiment of the present disclosure provides a beam failure recovery method, which is applied to a media access control (MAC) layer of a terminal and may include the following steps.

Step 11 includes: processing a random access procedure in accordance with a preset processing manner, when obtaining a new candidate beam during the random access procedure of transmitting a beam failure recovery request.

Among physical random access channel (PRACH) resources configured by a network device, part of the resources are used for normal random access other than beam failure recovery, the other part of the resources are used by the terminal to transmit a beam failure recovery request when a beam fails, and two parts of the resources are orthogonal to each other. That is, the PRACH resources used to transmit the beam failure recovery request are orthogonal to the PRACH resources used for normal random access (including orthogonal in time-domain and orthogonal in frequency-domain and/or orthogonal in code-domain). When a beam failure occurs, the terminal initiates a beam failure recovery procedure, and transmits a beam failure recovery request through a random access procedure.

Optionally, a manner in which the MAC layer obtains the new candidate beams includes, but not limited to: a physical layer indicating the new candidate beam to the MAC layer, or the MAC layer determining the new candidate beam through evaluation and/or selection. The new candidate beam indicated to the MAC layer by the physical layer is determined by the physical layer through evaluation and/or selection.

In an embodiment, before obtaining the new candidate beam, the method further includes indicating a physical layer to provide a candidate beam, in a case that at least one of following conditions is met:

a condition that the MAC layer or the physical layer triggers the beam failure recovery, that is, in a case that the MAC layer or the physical layer triggers the beam failure recovery, the MAC layer indicates the physical layer to provide the candidate beam:

a condition that the number of beam failure instances of the MAC layer or a physical layer reaches a preset number, that is, in a case that the number of beam failure instances of the MAC layer or the physical layer reaches the preset number, the MAC layer indicates the physical layer to provide the candidate beam;

a condition that a failure occurs to a random access procedure initiated by the MAC layer in a random access resource corresponding to a current candidate beam, that is, in a case that the random access procedure corresponding to the current candidate beam fails, the MAC layer indicates the physical layer to provide the candidate beam;

a condition that a failure occurs to transmission of a random access preamble for the MAC layer, that is, in a case that the transmission of the random access preamble fails, the MAC layer indicates the physical layer to provide the candidate beam;

a condition that a failure occurs to a contention-free random access at the MAC layer, that is, in a case that a failure occurs to a contention-free random access (CFRA) using a dedicated RACH resource, the MAC layer indicates the physical layer to provide the candidate beam; or a condition that a failure occurs to a contention-based random access at the MAC layer, that is, in a case that a failure occurs to a contention-based random access (CBRA) using a common RACH resource, the MAC layer indicates the physical layer to provide the candidate beam.

The beam failure recovery method according to embodiments of the present disclosure will be further described below in conjunction with different application scenarios.

In a first scenario, a new candidate beam is obtained, during a random access procedure of transmitting a beam failure recovery request.

In this scenario, in a case that a beam failure occurs to a beam for the terminal, the terminal initiates a beam failure recovery request process for the beam failure. When obtaining a new candidate beam during initiating the beam failure recovery request process, the MAC layer of the terminal processes the random access procedure in accordance with a preset processing manner. The preset processing manner includes but is not limited to one of the following six manners.

In a first manner, the MAC layer ignores the new candidate beam and continues to perform the random access procedure. In other words, in a case that a beam failure occurs to a beam for the terminal, the MAC layer of the terminal initiates a beam failure recovery request process for the beam failure. When the MAC layer of the terminal obtains a new candidate beam during initiating the beam failure recovery request process, the MAC layer directly ignores the new candidate beam and continues to perform the random access procedure. The continuing to perform the random access procedure herein refers to that a counter or a timer during the RACH procedure continues to work, such as a counter for counting the number of retransmissions of random access preamble and the transmission power ramping counter of random access preamble.

In a second manner, the MAC layer terminates the random access procedure. In other words, in a case that a beam failure occurs to a beam for the terminal, the MAC layer of the terminal initiates a beam failure recovery request process for the beam failure. When the MAC layer of the terminal obtains a new candidate beam during initiating the beam failure recovery request process, the MAC layer directly terminates the random access procedure.

In a third manner, the MAC layer continues to perform the random access procedure, and in a next random access preamble transmitting procedure, transmits a random access preamble in a random access resource corresponding to an original candidate beam. That is, in a case that a beam failure occurs to a beam for the terminal, the MAC layer of the terminal initiates a beam failure recovery request process for the beam failure. When the MAC layer of the terminal obtains a new candidate beam during initiating the beam failure recovery request process, the MAC layer continues to perform the random access procedure, and in the next preamble transmitting procedure, transmits the preamble in the random access resource corresponding to the original candidate beam.

In a fourth manner, the MAC layer terminates the random access procedure, and retransmits the beam failure recovery request in a random access resource corresponding to the new candidate beam. That is, in a case that a beam failure occurs to a beam for the terminal, the MAC layer of the terminal initiates a beam failure recovery request process for the beam failure. When the MAC layer of the terminal obtains a new candidate beam during initiating the beam failure recovery request process, the MAC layer directly terminates the current random access procedure, initiates a new random access procedure, and retransmits a beam failure recovery request in the random access resource corresponding to the new candidate beam. Configuration parameters, such as the number of preamble retransmissions and the power ramping counter, of the new random access procedure may be different from these in the terminated random access procedure.

In a fifth manner, the MAC restarts the random access procedure and transmits a beam failure recovery request in a random access resource corresponding to the new candidate beam. That is, in a case that a beam failure occurs to a beam for the terminal, the MAC layer of the terminal initiates a beam failure recovery request process for the beam failure. When the MAC layer of the terminal obtains a new candidate beam during initiating the beam failure recovery request process, the MAC layer restarts the current random access procedure and retransmits the beam failure recovery request through the random access resource corresponding to the new candidate beam. The restarting mentioned herein refers to clearing or resetting the number of preamble retransmissions and the power ramping counter in the current random access procedure.

In a sixth manner, the MAC continues to perform the random access procedure, and in a next random access preamble transmitting procedure, transmits a random access preamble in a random access resource corresponding to the new candidate beam. That is, in a case that a beam failure occurs to a beam for the terminal, the MAC layer of the terminal initiates a beam failure recovery request process for the beam failure. When the MAC layer of the terminal obtains a new candidate beam during initiating the beam failure recovery request process, the MAC layer continues to perform the random access procedure, and in the next preamble transmitting process, transmits the preamble through the random access resource corresponding to the new candidate beam.

It is worth noting that the continuing to perform the random access procedure in each of the above manners refers to that a counter or a timer during the RACH procedure continues to work or is not reset, such as a counter for counting the number of preamble retransmissions and a power ramping counter of preamble during the random access procedure. The restarting the random access procedure refers to that the counter or the timer during the RACH procedure is zero cleared or is reset, such as the counter for counting the number of preamble retransmissions and the power ramping counter of preamble during the random access procedure.

It is worth noting that before processing the random access procedure in accordance with the preset processing manner, the method further includes: detecting whether a beam failure recovery timer expires; and performing a step of processing the random access procedure in accordance with the preset processing manner, in a case that the beam failure recovery timer does not expire. In other words, the above operations are performed before beam failure recovery timer has not expired.

In a second scenario, when obtaining at least two candidate beams used to transmit the beam failure recovery request before transmitting the beam failure recovery request during the beam failure recovery procedure, the beam failure recovery request is transmitted in at least part of the at least two candidate beams, and the new candidate beam is obtained during transmitting the beam failure recovery request.

In this scenario, in a case that a beam failure occurs to a beam for the terminal, the terminal initiates a beam failure recovery request process for the beam failure. When obtaining multiple candidate beams during the initiating beam failure recovery request process, the MAC layer of the terminal may transmit the beam failure recovery request in one of the following manners, which is not limited hereto.

A first manner includes selecting a beam from the at least two candidate beams to transmit the beam failure recovery request.

The MAC layer may perform random access in a RACH resource corresponding to one candidate beam, which is selected from the at least two candidate beams according to the following rules, and may transmit a beam failure recovery request to a network device.

The MAC layer selects the beam with an optimum measurement result from the at least two candidate beams to transmit the beam failure recovery request. That is, the MAC layer selects the candidate beam with the optimum measurement result according to the measurement performances of the candidate beams, to transmit the beam failure recovery request. The optimum measurement result means that the channel quality is the best, which is indicated by the measurement result. The measurement result may be a result on at least one measure performance: Reference Signal Receiving Power (RSRP), Reference Signal Receiving Quality (RSRQ), Signal to Interference plus Noise Ratio (SINR), or Channel Quality Indicator (CQI).

The beam with an optimum measurement result is selected from candidate beams in the at least two candidate beams whose measurement result is better than a preset threshold, to transmit the beam failure recovery request. Considering a scenario of a poor network performance, the MAC layer selects the beam with the best measurement result, from the candidate beams whose measurement results are better than the preset threshold based on the measurement performances of the candidate beams, to transmit the beam failure recovery request.

Any one of the at least two candidate beams is selected to transmit the beam failure recovery request. That is, the MAC layer arbitrarily selects a candidate beam to transmit the beam failure recovery request.

Any one beam is selected from candidate beams in the at least two candidate beams whose measurement results are better than a preset threshold, to transmit the beam failure recovery request. Considering a poor network performance scenario, the MAC layer arbitrarily selects a beam from the candidate beams whose measurement results are better than the preset threshold based on the measurement performances of the candidate beams, to transmit the beam failure recovery request.

A beam is selected from the at least two candidate beams to transmit the beam failure recovery request, where a random access resource associated with the beam in the at least two candidate beams is a nearest random access resource. That is, the MAC layer selects the beam whose RACH resource is a nearest random access resource, from the at least two candidate beams.

A beam is selected from candidate beams in the at least two candidate beams whose measurement results are better than a preset threshold, to transmit the beam failure recovery request, where a random access resource associated with the beam from the candidate beams is a nearest random access resource. Considering a poor network performance scenario, the MAC layer arbitrarily selects a beam from the candidate beams whose measurement results are better than the preset threshold based on the measurement performances of the candidate beams, to transmit the beam failure recovery request, where the random access resource associated with the beam from the candidate beams is a nearest random access resource.

A second manner includes selecting part or all of the at least two candidate beams to transmit the beam failure recovery request in a predetermined order.

The preset order may include but is not limited to one of the following order rules:

a sequential order of random access resources corresponding to the at least two candidate beams, where the sequential order mentioned herein refers to an order from far to near;

an order of measurement results of the at least two candidate beams, where the order of measurement results mentioned herein refers to an order from a good measurement result to a poor measurement result;

a random order, where when selecting a beam from all of the at least two candidate beams in a predetermined order to transmit the beam failure recovery request, the predetermined order may be one of the above three orders;

a sequential order of random access resources corresponding to candidate beams in the at least two candidate beams whose measurement results are better than a preset threshold;

an order of measurement results of candidate beams, where the measurement results of the candidate beams in the at least two candidate beams are better than a preset threshold; or a random order of measurement results of candidate beams, where the measurement results of the candidate beams in the at least two candidate beams are better than a preset threshold. Considering a scenario where the network performance is poor, the MAC layer selects the candidate beams whose measurement results are better than the preset threshold value to transmit the beam failure recovery request according to measurement performances of the candidate beams. In a scenario of selecting a beam from some of the at least two candidate beams in a predetermined order to transmit the beam failure recovery request, the predetermined order may be one of the above three orders.

It is worth noting that in the second scenario, when the MAC layer obtains a new candidate beam during transmitting the beam failure recovery request, the random access procedure for beam failure recovery can be processed in the manner of the first scenario, so details thereof will not be repeated herein.

In an optional embodiment, after processing the random access procedure in accordance with a preset processing manner, the method further includes: when the random access procedure fails, performing at least one of the following actions:

transmitting the beam failure recovery request in a common random access resource, that is, the terminal performs contention-based random access by using a common RACH resource, and continues to perform the beam failure recovery process;

indicating a failure of the random access procedure to an upper layer;

indicating a failure of the random access procedure to a lower layer such as a physical layer;

determining a failure of the beam failure recovery, that is, the MAC layer directly states that the beam failure recovery fails, where optionally, the MAC layer notifies a failure indication about the failure of the random access procedure to the upper layer, or optionally, the MAC layer notifies a failure indication about the failure of the random access procedure to the PHY layer;

determining a radio link failure (RLF), that is, the MAC layer directly declares the RLF;

indicating, to a physical layer, a failure of a current beam failure recovery, that is, the MAC layer indicates the failure of the current beam failure recovery to the PHY layer; or indicating a physical layer to provide a new candidate beam, that is, the MAC layer indicates the PHY layer to provide the new candidate beam.

It is worth rioting that before performing one of the above actions, the method further includes: detecting whether a beam failure recovery timer expires; and processing one of the above actions, in a case that the beam failure recovery timer does not expire. That is, before the beam failure recovery tinier expires, the above actions are performed.

Optionally, in a case that the terminal uses a common RACH resource for contention-based random access and continues the beam failure recovery procedure, when the transmission of the beam failure recovery request fails, the terminal performs one of the following actions:

indicating, to the upper layer, a failure indication about the failure of transmitting the beam failure recovery request;

indicating, to the lower layer, a failure indication about the failure of transmitting the beam failure recovery request;

determining the failure of the beam failure recovery;

determining a radio link failure;

indicating, to the physical layer, the failure of the current beam failure recovery; or indicating the physical layer to provide the new candidate beam.

Similarly, before performing one of the above actions, the method further includes: detecting whether a beam failure recovery timer expires; and processing one of the above actions, in a case that the beam failure recovery timer does not expire. That is, before the beam failure recovery timer expires, the above actions are performed.

In the beam failure recovery method according to the embodiment of the present disclosure, when obtaining a new candidate beam during a random access procedure of transmitting a beam failure recovery request, a MAC layer of a terminal process the random access procedure in accordance with a preset processing manner, thereby ensuring that the beam failure recovery is completed as soon as possible and ensuring normal data transmission between the terminal and the network device.

Different scenarios of the beam failure recovery method are respectively described in detail in the above embodiments. In the following embodiments, the corresponding terminal be further described with reference to the drawings.

As shown in FIG. 2, the terminal 200 according to the embodiments of the present disclosure can implement details of the method in the above embodiments, which includes processing a random access procedure in accordance with a preset processing manner, when obtaining a new candidate beam during the random access procedure of transmitting a beam failure recovery request. The same effects can be achieved. The terminal 200 specifically includes the following functional modules:

a first processing module 210, configured to process a random access procedure in accordance with a preset processing manner, when obtaining a new candidate beam during the random access procedure of transmitting a beam failure recovery request.

The first processing module 210 includes one of the following:

a first processing submodule, configured to ignore the new candidate beam, and continue to perform the random access procedure;

a second processing submodule, configured to terminate the random access procedure;

a third processing sub nodule, configured to continue to perform the random access procedure, and transmit, in a next random access preamble transmitting procedure, a random access preamble in a random access resource corresponding to an original candidate beam;

a fourth processing submodule, configured to terminate the random access procedure, and retransmit the beam failure recovery request in a random access resource corresponding to the new candidate beam;

a fifth processing submodule, configured to restart the random access procedure, and transmit the beam failure recovery request in a random access resource corresponding to the new candidate beam; or a sixth processing submodule, configured to continue to perform the random access procedure, and transmit, in a next random access preamble transmitting procedure, a random access preamble in a random access resource corresponding to the new candidate beam.

The terminal 200 further includes a second processing module, configured to, when obtaining at least two candidate beams used to transmit the beam failure recovery request, select a beam from the at least two candidate beams to transmit the beam failure recovery request; or select part or all of the at least two candidate beams to transmit the beam failure recovery request in a predetermined order.

The second processing module includes one of the followings:

a seventh processing submodule, configured to select the beam with an optimum measurement result from the at least two candidate beams to transmit the beam failure recovery request;

an eighth processing submodule, configured to select the beam with an optimum measurement result from candidate beams in the at least two candidate beams to transmit the beam failure recovery request, where measurement results of the candidate beams in the at least two candidate beams are better than a preset threshold;

a ninth processing submodule, configured to select any one of the at least two candidate beams to transmit the beam failure recovery request;

a tenth processing submodule, configured to select any one beam from candidate beams in the at least two candidate beams, to transmit the beam failure recovery request, where measurement results of the candidate beams in the at least two candidate beams are better than a preset threshold;

an eleventh processing submodule, configured to select a beam from the at least two candidate beams to transmit the beam failure recovery request, where a random access resource associated with the beam in the at least two candidate beams is a nearest random access resource; or a twelfth processing submodule, configured to select a beam from candidate beams in the at least two candidate beams whose measurement results are better than a preset threshold, to transmit the beam failure recovery request, where a random access resource associated with the beam from the candidate beams is a nearest random access resource.

The preset order includes one of the following:

a sequential order of random access resources corresponding to the least two candidate beams;

an order of measurement results of the at least two candidate beams;

a random order;

a sequential order of random access resources corresponding to candidate beams in the at least two candidate beams whose measurement results are better than a preset threshold;

an order of measurement results of candidate beams, where measurement results of the candidate beams in the at least two candidate beams are better than a preset threshold; or a random order of measurement results of candidate beams, where measurement results of the candidate beams in the at least two candidate beams are better than a preset threshold.

The terminal 200 further includes a third processing module configured to perform, in a case that the random access procedure fails, at least one of following operations:

transmitting the beam failure recovery request in a common random access resource;

indicating, to an upper layer, a failure indication about a failure of the random access procedure;

indicating, to a lower layer, a failure indication about a failure of the random access procedure;

determining a failure of the beam failure recovery;

determining a radio link failure;

indicating, to a physical layer, a failure of a current beam failure recovery; or indicating a physical layer to provide the new candidate beam.

The terminal 200 further includes: a fourth processing module configured to perform, in a case that a failure occurs to transmitting the beam failure recovery request, perform one of following operations:

indicating, to the upper layer, a failure indication about the failure of transmitting the beam failure recovery request;

indicating, to the lower layer, a failure indication about the failure of transmitting the beam failure recovery request;

determining the failure of the beam failure recovery;

determining the failure of the radio link;

indicating, to the physical layer, the failure of the current beam failure recovery; or indicating the physical layer to provide the new candidate beam.

The new candidate beam is indicated to the MAC layer by a physical layer, or the new candidate beam is determined by the MAC layer based on evaluation and/or selection.

The terminal 200 further includes: an indicating module configured to indicate a physical layer to provide a candidate beam, in a case that at least one of following conditions is met:

a condition that the MAC layer or a physical layer triggers the beam failure recovery;

a condition that the number of beam failure instances of the MAC layer or a physical layer reaches a preset number;

a condition that a failure occurs to a random access procedure initiated by the MAC layer in a random access resource corresponding to a current candidate beam;

a condition that a failure occurs to a random access preamble transmission at the MAC layer;

a condition that a failure occurs to a contention-free random access at the MAC layer; or a condition that a failure occurs to a contention-based random access at the MAC layer.

The terminal 200 further includes: a detection module configured to detect whether a beam failure recovery timer expires; and process the random access procedure in accordance with the preset processing manner, in a case that the beam failure recovery tinier does not expire.

It is worth noting that, the terminal according to the embodiments of the present disclosure processes a random access procedure in accordance with a preset processing manner at the MAC layer, when obtaining a new candidate beam during the random access procedure of transmitting a beam failure recovery request, thereby ensuring that the beam failure recovery is completed as soon as possible and ensuring normal data transmission between the terminal and a network device.

Second Embodiment

During a beam failure recovery process, when receiving multiple candidate beams indicated by the PHY layer, the terminal cannot determine how to deal with them, which may cause a failure to beam failure recovery.

To solve the above problem, a beam failure recovery method according the embodiments of the present disclosure as shown in FIG. 3 includes the following steps.

Step 31 includes: when obtaining at least two candidate beams used to transmit a beam failure recovery request during a beam failure recovery procedure, selecting a beam from the at least two candidate beams to transmit the beam failure recovery request; or selecting part or all of the at least two candidate beams to transmit the beam failure recovery request in a predetermined order.

In a case that a beam failure occurs to a beam for the terminal, the terminal initiates a beam failure recovery request process for the beam failure. When obtaining multiple candidate beams during initiating beam failure recovery request process, the MAC layer of the terminal may transmit the beam failure recovery request in one of the following manners, which is not limited hereto.

A first manner includes selecting a beam from the at least two candidate beams to transmit the beam failure recovery request.

The MAC layer may perform random access in a RACH resource corresponding to one candidate beam, which is selected from the at least two candidate beams according to the following rules, and may transmit a beam failure recovery request to a network device.

The MAC layer selects the beam with an optimum measurement result from the at least two candidate beams to transmit the beam failure recovery request. That is, the MAC layer selects the candidate beam with the optimum measurement result according to the measurement performances of the candidate beams, to transmit the beam failure recovery request. The optimum measurement result means that the channel quality is the best, which is indicated by the measurement result. The measurement result may be a result on at least one measure performance: RSRP, RSRQ, SINR or CQI.

The beam with an optimum measurement result is selected from candidate beams in the at least two candidate beams whose measurement result is better than a preset threshold, to transmit the beam failure recovery request. Considering a scenario of a poor network performance, the MAC layer selects the beam with the best measurement result, from the candidate beams whose measurement results are better than the preset threshold based on the measurement performances of the candidate beams, to transmit the beam failure recovery request.

Any one of the at least two candidate beams is selected to transmit the beam failure recovery request. That is, the MAC layer arbitrarily selects a candidate beam to transmit the beam failure recovery request.

Any one beam is selected from candidate beams in the at least two candidate beams whose measurement results are better than a preset threshold, to transmit the beam failure recovery request. Considering a poor network performance scenario, the MAC layer arbitrarily selects a beam from the candidate beams whose measurement results are better than the preset threshold based on the measurement performances of the candidate beams, to transmit the beam failure recovery request.

A beam is selected from the at least two candidate beams to transmit the beam failure recovery request, where a random access resource associated with the beam in the at least two candidate beams is a nearest random access resource. That is, the MAC layer selects the beam whose RACH resource is a nearest random access resource, from the at least two candidate beams.

A beam is selected from candidate beams in the at least two candidate beams whose measurement results are better than a preset threshold, to transmit the beam failure recovery request, where a random access resource associated with the beam from the candidate beams is a nearest random access resource. Considering a poor network performance scenario, the MAC layer arbitrarily selects a beam from the candidate beams whose measurement results are better than the preset threshold based on the measurement performances of the candidate beams, to transmit the beam failure recovery request, where the random access resource associated with the beam from the candidate beams is a nearest random access resource.

A second manner includes selecting part or all of the at least two candidate beams to transmit the beam failure recovery request in a predetermined order.

The preset order may include but is not limited to one of the following order rules:

a sequential order of random access resources corresponding to the at least two candidate beams, where the sequential order mentioned herein refers to an order from far to near;

an order of measurement results of the at least two candidate beams, where the order of measurement results mentioned herein refers to an order from a good measurement result to a poor measurement result; or a random order.

When selecting a beam from all of the at least two candidate beams in a predetermined order to transmit the beam failure recovery request, the predetermined order may be one of the above orders.

A sequential order of random access resources corresponding to candidate beams in the at least two candidate beams whose measurement results are better than a preset threshold;

An order of measurement results of candidate beams, where measurement results of the candidate beams in the at least two candidate beams are better than a preset threshold; or A random order of measurement results of candidate beams, where the measurement results of the candidate beams in the at least two candidate beams are better than a preset threshold. Considering a scenario where the network performance is poor, the MAC layer selects the candidate beams whose measurement results are better than the preset threshold value to transmit the beam failure recovery request according to measurement performances of the candidate beams. In a scenario of selecting a beam from some of the at least two candidate beams in a predetermined order to transmit the beam failure recovery request, the predetermined order may be one of the above orders.

In an optional embodiment, subsequent to step 31, the method may further include: in a case that the beam failure recovery request is not successfully transmitted, performing at least one of the following actions:

transmitting the beam failure recovery request in a common random access resource, that is, the terminal performs contention-based random access by using a common RACH resource, and continues to perform beam failure recovery processes;

indicating a failure of the random access procedure to an upper layer;

indicating a failure of the random access procedure to a lower layer such as a physical layer;

determining a failure of the beam failure recovery, that is, the MAC layer directly states that the beam failure recovery fails, where optionally, the MAC layer notifies a failure indication about the failure of the random access procedure to the upper layer, or optionally, the MAC layer notifies a failure indication about the failure of the random access procedure to the PHY layer;

determining a radio link failure (RLF), that is, the MAC layer directly declares the RLF;

indicating, to a physical layer, a failure of a current beam failure recovery, that is, the MAC layer indicates the failure of the current beam failure recovery to the PHY layer; or indicating a physical layer to provide a new candidate beam, that is, the MAC layer indicates the PHY layer to provide the new candidate beam.

It is worth rioting that before performing one of the above actions, the method further includes: detecting whether a beam failure recovery timer expires; and processing one of the above actions, in a case that the beam failure recovery timer does not expire. That is, before the beam failure recovery timer has expired, the above actions are performed.

In the beam failure recovery method according to the embodiments of the present disclosure, when obtaining at least two candidate beams used to transmit a beam failure recovery request during a beam failure recovery procedure, the MAC layer of the terminal selects a beam from the at least two candidate beams to transmit the beam failure recovery request; or selects part or all of the at least two candidate beams to transmit the beam failure recovery request in a predetermined order, thereby ensuring that the beam failure recovery is completed as soon as possible and ensuring normal data transmission between the terminal and a network device.

Different scenarios of the beam failure recovery method are respectively described in detail in the above embodiments. In the following embodiments, the corresponding terminal will be further described with reference to the drawings.

As shown in FIG. 4, the terminal 400 according to the embodiments of the present disclosure can implement details of the method in the above embodiments, which includes when obtaining at least two candidate beams used to transmit a beam failure recovery request during a beam failure recovery procedure, selecting a beam from the at least two candidate beams to transmit the beam failure recovery request; or selecting part or all of the at least two candidate beams to transmit the beam failure recovery request in a predetermined order. The same effects can be achieved. The terminal 400 specifically includes the following functional modules:

a second processing module 410, configured to, when obtaining at least two candidate beams used to transmit a beam failure recovery request during a beam failure recovery procedure, select a beam from the at least two candidate beams to transmit the beam failure recovery request; or select part or all of the at least two candidate beams to transmit the beam failure recovery request in a predetermined order.

The second processing module 410 includes one of the followings:

a seventh processing submodule, configured to select the beam with an optimum measurement result from the at least two candidate beams to transmit the beam failure recovery request;

an eighth processing submodule, configured to select the beam with an optimum measurement result from candidate beams in the at least two candidate beams to transmit the beam failure recovery request, where measurement results of the candidate beams in the at least two candidate beams are better than a preset threshold;

a ninth processing submodule, configured to select any one of the at least two candidate beams to transmit the beam failure recovery request;

a tenth processing submodule, configured to select any one beam from candidate beams in the at least two candidate beams, to transmit the beam failure recovery request, where measurement results of the candidate beams in the at least two candidate beams are better than a preset threshold;

an eleventh processing submodule, configured to select a beam from the at least two candidate beams to transmit the beam failure recovery request, where a random access resource associated with the beam in the at least two candidate beams is a nearest random access resource; or a twelfth processing submodule, configured to select a beam from candidate beams in the at least two candidate beams whose measurement results are better than a preset threshold, to transmit the beam failure recovery request, where a random access resource associated with the beam from the candidate beams is a nearest random access resource.

The preset order includes one of the followings:

a sequential order of random access resources corresponding to the at least two candidate beams;

an order of measurement results of the at least two candidate beams;

a random order;

a sequential order of random access resources corresponding to candidate beams in the at least two candidate beams whose measurement results are better than a preset threshold;

an order of measurement results of candidate beams, where measurement results of the candidate beams in the at least two candidate beams are better than a preset threshold; or a random order of measurement results of candidate beams, where measurement results of the candidate beams in the at least two candidate beams are better than a preset threshold.

The terminal 400 further includes: a fifth processing module configured to, in a case that the beam failure recovery request is unsuccessfully transmitted, perform at least one of following operations:

transmitting the beam failure recovery request in a common random access resource;

indicating, to an upper layer, a failure indication about a failure of the random access procedure;

indicating, to a lower layer, a failure indication about a failure of the random access procedure;

determining a failure of the beam failure recovery;

determining a radio link failure;

indicating, to a physical layer, a failure of a current beam failure recovery; or indicating a physical layer to provide a new candidate beam.

It is worth noting that when obtaining at least two candidate beams used to transmit a beam failure recovery request during a beam failure recovery procedure at a MAC layer, the terminal according to the embodiments of the present disclosure selects a beam front the at least two candidate beams to transmit the beam failure recovery request; or selects part or all of the at least two candidate beams to transmit the beam failure recovery request in a predetermined order, thereby ensuring that the beam failure recovery is completed as soon as possible and ensuring normal data transmission between the terminal and a network device.

It should be noted that division of the above modules should be understood as only a logical division, which may be integrated into a physical entity or physically separated from each other in practice. All these modules may be implemented in the form of software invoked by a processing element, or in the form of hardware; or some modules may be implemented in the form of software invoked by a processing element, while some other modules may be implemented in the form of hardware. For example, the determination module may be a separately arranged processing element, or may be integrated into a chip of the above devices, or may be stored in a memory of the above devices in the form of program code, where functions of the determination module are invoked and executed by a processing element of the above devices, and implementations of other modules are similar to these. In addition, all or part of these modules can be integrated together or implemented independently. The processing element described herein may be an integrated circuit with signal processing capability. During implementations, the above-mentioned steps or the above-mentioned modules may be completed by the integrated logic circuit in the form of hardware in the processing element or by instructions in the form of software.

For example, the above modules may be one or more integrated circuits configured to implement the above methods, such as one or more Application Specific Integrated Circuits (ASICs), one or more Digital Signal Processors (DSPs), or one or more Field Programmable Gate Arrays (FPGAs). For another example, when one of the above modules is implemented in the form of a processing element scheduling codes, the processing element may be a general purpose processor, such as a central processing unit (CPU) or another processor that can call program codes. For another example, these modules may be integrated together in the form of System-On-a-Chip (SOC).

In order to better achieve the above objectives, further, FIG. 5 is a schematic diagram of a hardware structure of a terminal for implementing various embodiments of the present disclosure. The terminal 50 includes but is not limited to: a radio frequency unit 51, a network module 52, an audio output unit 53, an input unit 54, a sensor 55, a display unit 56, a user input unit 57, an interface unit 58, a memory 59, a processor 510, and a power supply 511, and other components. Those skilled in the art may understand that the terminal structure shown in FIG. 5 does not constitute a limitation on the terminal, and the terminal may include more or fewer components than these as shown in FIG. 5, or may combine certain components, or may have different component arrangements. In the embodiments of the present disclosure, the terminal includes but is not limited to a mobile phone, a tablet computer, a notebook computer, a palmtop computer, an in-vehicle terminal, a wearable device, and a pedometer.

The radio frequency unit 51 is configured to transmit and receive data under the control of the processor 510.

The processor 510 is configured to process a random access procedure in accordance with a preset processing manner, when obtaining a new candidate beam during the random access procedure of transmitting a beam failure recovery request.

The terminal according to the embodiments of the present disclosure processes a random access procedure in accordance with a preset processing manner, when obtaining a new candidate beam during the random access procedure of transmitting a beam failure recovery request at the MAC layer, thereby ensuring that the beam failure recovery is completed as soon as possible and ensuring normal data transmission between the terminal and a network device.

Further, the processor 510 is configured to, when obtaining at least two candidate beams used to transmit a beam failure recovery request during a beam failure recovery procedure, select a beam from the at least two candidate beams to transmit the beam failure recovery request; or select part or all of the at least two candidate beams to transmit the beam failure recovery request in a predetermined order.

When obtaining at least two candidate beams used to transmit a beam failure recovery request during a beam failure recovery procedure at a MAC layer, the terminal according to the embodiments of the present disclosure selects a beam from the at least two candidate beams to transmit the beam failure recovery request; or selects part or all of the at least two candidate beams to transmit the beam failure recovery request in a predetermined order, thereby ensuring that the beam failure recovery is completed as soon as possible and ensuring normal data transmission between the terminal and a network device.

It should be understood that, in the embodiments of the present disclosure, the radio frequency unit 51 may be configured to receive and send information, or to receive and send signals in a call. Specifically, the radio frequency unit 50 delivers the downlink information received from a base station to the processor 510. Generally, the radio frequency unit 51 includes, but is not limited to, an antenna, at least one amplifier, a transceiver, a coupler, a low noise amplifier, a duplexer, or the like. In addition, the radio frequency unit 51 may communicate with a network or other devices via a wireless communication system.

The terminal provides users with wireless broadband Internet access via the network module 502, such as helping users send and receive emails, browse web pages and access streaming media.

The audio output unit 53 may convert audio data received by the radio frequency unit 51 or the network module 502 or stored in the memory 59 into audio signals and output them as sound. Moreover, the audio output unit 53 may provide audio output (for example, call signal reception sound, message reception sound, etc.) related to a specific function performed by the terminal 50. The audio output unit 53 includes a speaker, a buzzer, a receiver, or the like.

The input unit 54 is configured to receive audio or video signals. The input unit 54 may include a graphics processing unit (GPU) 541 and a microphone 542. The graphics processor 541 is configured to process image data of still pictures or videos obtained via an image capture device (such as a camera) in an image capture mode or a video capture mode. The processed image frames may be displayed on the display unit 56. The image frames processed by the graphics processor 541 may be stored in the memory 59 (or other storage medium) or transmitted via the radio frequency unit 51 or the network module 52. The microphone 542 may receive sound, and may process the sound into audio data. The processed audio data may be converted into a format that can be transmitted to a mobile communication base station for outputting via the radio frequency unit 51 in the case of a telephone call mode.

The terminal 50 further includes at least one sensor 55, such as an optical sensor, a motion sensor, or other sensors. Specifically, the optical sensor includes an ambient light sensor and a proximity sensor. The ambient light sensor may adjust brightness of the display panel 561 according to the brightness of the ambient light, and the proximity sensor may close the display panel 561 and/or backlight when the terminal 50 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the terminal (such as switching of horizontal and vertical screen, a correlated game, magnetometer pose calibration), a function about vibration recognition (such as pedometer, tapping). The sensor 55 may also include a fingerprint sensor, a pressure sensor, an iris sensor, a molecular sensor, a gyroscope, a barometer, a hygrometer, a thermometer, an infrared sensors, or the like, which are not described herein.

The display unit 56 is configured to display information input by the user or information provided for the user. The display unit 56 may include a display panel 561. The display panel 561 may be configured in the form of a liquid crystal display (LCD), an organic light-emitting diode (OLED), or the like.

The user input unit 57 may be configured to receive inputted numeric or character information, and generate key signal inputs related to user settings and function control of the terminal. Specifically, the user input unit 57 includes a touch panel 571 and other input device 572. The touch panel 571, also known as a touch screen, may collect a touch operation of a user thereon or thereby (for example, an operation on or around the touch panel 571 that is made by a user with a finger, a touch pen or any other suitable object or accessory). The touch panel 571 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 510. The touch controller may receive a command from by the processor 510 and executes the command In addition, the touch panel 571 may be implemented by various types such as a resistive panel, a capacitive panel, an infrared panel, or a surface acoustic wave panel. In addition to the touch panel 571, the user input unit 57 may include other input device 572. Specifically, the other input device 572 may include, but is not limited to, a physical keyboard, a function key (such as a volume control key, a switch key), a trackball, a mouse, or a joystick, which are not described herein.

Further, the display panel 561 may be covered by the touch panel 571. When the touch panel 571 detects a touch operation on or near the touch panel 571, the touch panel 571 transmits the touch operation to the processor 510 to determine the type of the touch event, and the processor 510 provides a corresponding visual output on the display panel 561 according to the type of touch event. Although the touch panel 571 and the display panel 561 are implemented as two independent components to implement the input and output functions of the terminal in FIG. 5, in some embodiments, the touch panel 571 and the display panel 561 may be integrated to implement the input and output functions of the terminal, which are not limited herein.

The interface unit 58 is an interface through which an external device is connected to the terminal 50. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 58 may be configured to receive input (e.g., data information, power, etc.) from an external device and transmit the received input to one or more elements in the terminal 50 or may be configured to transmit data between the terminal 50 and the external device.

The memory 59 may be configured to store software programs and various data. The memory 59 may mainly include a program storage area and a data storage area, where the program storage area may store an operating system, an application program (such as a sound playback function, an image playback function, etc.) required for at least one function; the data storage area may store data (such as audio data, a phone book, etc.) created according to the use of the mobile phone. In addition, the memory 59 may include a high-speed random access memory, and may further include a non-volatile memory, such as at least one magnetic disk storage device, a flash memory device, or other volatile solid-state storage device.

The processor 510 is a control center of the terminal, which uses various interfaces and lines to connect various parts of the entire terminal. The processor 510 runs or executes software programs and/or modules stored in the memory 59 and calls data stored in the memory 59, to execute various functions of the terminal and process data, so as to monitor the terminal as a whole. The processor 510 may include one or more processing units. Optionally, the processor 510 may integrate an application processor and a modem processor. The application processor mainly processes an operating system, a user interface, an application program, etc., and the modem processor mainly processes wireless communications. It can be understood that the foregoing modem processor may not be integrated into the processor 510.

The terminal 50 may further include a power supply 511 (such as a battery) for supplying power to various components. Optionally, the power supply 511 may be logically connected to the processor 510 through a power management system, so as to implement functions, such as management of charging and discharging, and power consumption management, via the power management system.

In addition, the terminal 50 may include some functional modules that are not shown, which are not described herein again.

Optionally, embodiments of the present disclosure further provide a terminal, including a processor 510, a memory 59, and a computer program stored on the memory 59 and executable by the processor 510. When executing the computer program, the processor 510 is configured to implement various processes of the above embodiments about the beam failure recovery method, and the same technical effect can be achieved. To avoid repetition, they will not be repeated herein. The terminal may be a wireless terminal or a wired terminal. The wireless terminal may be a device that provides data connectivity of voices and/or other services to a user, a handheld device with a wireless communication function, or other processing devices connected to a wireless modem. A wireless terminal may communicate with one or more core networks over a radio access network (RAN). The wireless terminal may be a mobile terminal such as a mobile phone (also referred to as a "cellular" phone) and a computer with a mobile terminal, which, for example, may be a portable, pocket-size, handheld, computer-built or vehicle-mounted mobile device. The wireless terminal exchanges language and/or data with a wireless access network, and may include a personal communication service (PCS) phone, a cordless phone, a session initiation protocol (SIP) phone, a wireless local loop (WLL) station, a personal digital assistant (PDA), and other devices. The wireless terminal may also be: a system, a subscriber unit, a subscriber station, a mobile station, a remote station, a remote terminal, an access terminal, a user terminal, a user agent, a user device or a user equipment, which is not limited herein.

Embodiments of the present disclosure further provide a computer-readable storage medium. A program is stored on the computer-readable storage medium. The program is executed by a processor to implement various processes of the above embodiments about the beam failure recovery method, and the same technical effect can be achieved. To avoid repetition, they will not be repeated herein. The computer-readable storage medium may be, for example, a read-only memory (ROM for short), a random access memory (RAM for short), a magnetic disk or an optical disk, etc.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but the implementation should not be considered as going beyond the scope of the present disclosure.

It may be clearly understood by a person skilled in the art that, for ease of description and conciseness, for a detailed working process of the foregoing system, device, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that may store program code, such as a universal serial bus (USB) flash drive, a mobile hard disk, an RON, an RAM, a magnetic disk, or an optical disc.

Further, it is noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other. It is appreciated by a person of ordinary skill in the art that, all or any steps or components of the method and apparatus of the present disclosure may be implemented in form of hardware, firmware, software or a combination thereof in any computing device (including a processor, storage medium or the like) or a network of computing devices, which may be realized by a person of ordinary skill in the art, having read the description of the present disclosure, and using basic programing skills.

Therefore, the objective of the present disclosure may further be achieved by running a program or a group of programs on any computing device. The computing device may be a well-known and general-purpose device. Thus, the objective of the present disclosure may further be achieved by providing a program product including program codes configured to implement the method or apparatus. In other words, such a program product constitutes the present disclosure, and a storage medium storing such a program product also constitutes the present disclosure. Obviously, the storage medium may be any well-known storage medium or any storage medium to be developed in the future. It is also noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other.

Optional implementations of the present disclosure are described above. It should be noted that, numerous modifications and improvements may be made by a person of ordinary skill in the art without departing from the principles of the present disclosure, and these modifications and improvements shall also fall within the protection scope of the present disclosure.

What is claimed is:

1. A beam failure recovery method, applied to a media access control (MAC) layer of a terminal, comprising:
   processing a random access procedure in accordance with a preset processing manner, when obtaining a new candidate beam during the random access procedure of transmitting a beam failure recovery request;
   wherein before the processing the random access procedure in accordance with the preset processing manner when obtaining the new candidate beam, the beam failure recovery method further comprises:
   before transmitting the beam failure recovery request during a beam failure recovery procedure, when obtaining at least two candidate beams, indicated by a physical layer, used to transmit the beam failure recovery request, selecting by the MAC layer a beam from the at least two candidate beams to transmit the beam failure recovery request; or selecting by the MAC layer some or all of the at least two candidate beams to transmit the beam failure recovery request in a predetermined order;
   wherein the predetermined order comprises one of following:
   a sequential order of random access resources corresponding to the at least two candidate beams;
   an order of measurement results of the at least two candidate beams;
   a random order;
   a sequential order of random access resources corresponding to candidate beams whose measurement results are better than a preset threshold, in the at least two candidate beams;
   an order of measurement results of candidate beams, wherein the measurement results of the candidate beams in the at least two candidate beams are better than a preset threshold; or
   a random order of measurement results of candidate beams, wherein the measurement results of the candidate beams in the at least two candidate beams are better than a preset threshold.

2. The beam failure recovery method according to claim 1, wherein the processing the random access procedure in accordance with the preset processing manner comprises one of following:
   ignoring the new candidate beam, and continuing to perform the random access procedure;
   terminating the random access procedure;
   continuing to perform the random access procedure, and transmitting, in a next random access preamble transmitting procedure, a random access preamble in a random access resource corresponding to an original candidate beam;
   terminating the random access procedure, and retransmitting the beam failure recovery request in a random access resource corresponding to the new candidate beam;
   restarting the random access procedure, and transmitting a beam failure recovery request in a random access resource corresponding to the new candidate beam; or
   continuing to perform the random access procedure, and transmitting, in a next random access preamble transmitting procedure, a random access preamble in a random access resource corresponding to the new candidate beam.

3. The beam failure recovery method according to claim 1, wherein after processing the random access procedure in accordance with the preset processing manner, the method further comprises: when the random access procedure fails, performing at least one of following operations:
   transmitting the beam failure recovery request in a common random access resource;
   indicating, to an upper layer, a failure of the random access procedure;
   indicating, to a lower layer, a failure of the random access procedure;
   determining a failure of the beam failure recovery;
   determining a radio link failure;
   indicating, to the physical layer, a failure of a current beam failure recovery; or
   indicating the physical layer to provide a new candidate beam.

4. The beam failure recovery method according to claim 3, wherein after transmitting the beam failure recovery request in the common random access resource, the method further comprises: when a failure occurs to transmitting the beam failure recovery request, performing one of following operations:
   indicating, to the upper layer, a failure indication about the failure of transmitting the beam failure recovery request;
   indicating, to the lower layer, a failure indication about the failure of transmitting the beam failure recovery request;
   determining the failure of the beam failure recovery;
   determining a radio link failure;
   indicating, to the physical layer, the failure of the current beam failure recovery; or
   indicating the physical layer to provide the new candidate beam.

5. The beam failure recovery method according to claim 1, wherein the new candidate beam is indicated to the MAC layer by the physical layer, or the new candidate beam is determined by the MAC layer based on at least one of evaluation or selection.

6. The beam failure recovery method according to claim 1, wherein before obtaining the new candidate beam, the method further comprises indicating the physical layer to provide a candidate beam, in a case that at least one of following conditions is met:
   a condition that the MAC layer or the physical layer triggers the beam failure recovery;
   a condition that the number of beam failure instances of the MAC layer or the physical layer reaches a preset number;
   a condition that a failure occurs to a random access procedure initiated by the MAC layer in a random access resource corresponding to a current candidate beam;
   a condition that a failure occurs to a random access preamble transmission at the MAC layer;
   a condition that a failure occurs to a contention-free random access at the MAC layer; or
   a condition that a failure occurs to a contention-based random access at the MAC layer.

7. The beam failure recovery method according to claim 1, wherein before processing the random access procedure in accordance with the preset processing manner, the method further comprises:
   detecting whether a beam failure recovery timer expires; and
   processing the random access procedure in accordance with the preset processing manner, in a case that the beam failure recovery timer does not expire.

8. The beam failure recovery method according to claim 1, wherein the selecting the beam from the at least two candidate beams to transmit the beam failure recovery request comprises one of following:
   selecting the beam with an optimum measurement result from the at least two candidate beams to transmit the beam failure recovery request;
   selecting the beam with an optimum measurement result from candidate beams in the at least two candidate beams to transmit the beam failure recovery request, wherein measurement results of the candidate beams in the at least two candidate beams are better than a preset threshold;
   selecting any one of the at least two candidate beams to transmit the beam failure recovery request;
   selecting any one beam from candidate beams in the at least two candidate beams, to transmit the beam failure recovery request, wherein measurement results of the candidate beams in the at least two candidate beams are better than a preset threshold;
   selecting a beam from the at least two candidate beams to transmit the beam failure recovery request, wherein the random access resource associated with the beam in the at least two candidate beams is a nearest random access resource; or
   selecting a beam from candidate beams in the at least two candidate beams whose measurement results are better than a preset threshold, to transmit the beam failure recovery request, wherein a random access resource associated with the beam from the candidate beams is a nearest random access resource.

9. A terminal, comprising: a processor, a memory, and a program that is stored on the memory and executable on the processor, wherein when executing the program, the processor is configured to:
   process a random access procedure in accordance with a preset processing manner, when obtaining a new candidate beam during the random access procedure of transmitting a beam failure recovery request;
   wherein the processor is further configured to perform the following operation, before the processing the random access procedure in accordance with the preset processing manner when obtaining the new candidate beam:
   before transmitting the beam failure recovery request during a beam failure recovery procedure, when obtaining at least two candidate beams, indicated by a physical layer, used to transmit the beam failure recovery request, select by a media access control (MAC) layer a beam from the at least two candidate beams to transmit the beam failure recovery request; or select by a media access control (MAC) layer some or all of the at least two candidate beams to transmit the beam failure recovery request in a predetermined order;
   wherein the predetermined order comprises one of following:
   a sequential order of random access resources corresponding to the at least two candidate beams;
   an order of measurement results of the at least two candidate beams;
   a random order;
   a sequential order of random access resources corresponding to candidate beams in the at least two candidate beams whose measurement results are better than a preset threshold;
   an order of measurement results of candidate beams, wherein the measurement results of the candidate beams in the at least two candidate beams are better than a preset threshold; or
   a random order of measurement results of candidate beams, wherein the measurement results of the candidate beams in the at least two candidate beams are better than a preset threshold.

10. The terminal according to claim 9, wherein the processor is further configured to:
   ignore the new candidate beam, and continue to perform the random access procedure;
   terminate the random access procedure;
   continue to perform the random access procedure, and transmit, in a next random access preamble transmitting procedure, a random access preamble in a random access resource corresponding to an original candidate beam;

terminate the random access procedure, and retransmit the beam failure recovery request in a random access resource corresponding to the new candidate beam;

restart the random access procedure, and transmit a beam failure recovery request in a random access resource corresponding to the new candidate beam; or continue to perform the random access procedure, and transmit, in a next random access preamble transmitting procedure, a random access preamble in a random access resource corresponding to the new candidate beam.

11. The terminal according to claim 9, wherein the processor is further configured to: perform, when the random access procedure fails, at least one of following operations:

transmitting the beam failure recovery request in a common random access resource;

indicating, to an upper layer, a failure of the random access procedure;

indicating, to a lower layer, a failure of the random access procedure;

determining a failure of the beam failure recovery;

determining a radio link failure;

indicating, to the physical layer, a failure of a current beam failure recovery; or indicating the physical layer to provide a new candidate beam.

12. The terminal according to claim 11, wherein the processor is configured to: when a failure occurs to the transmitting the beam failure recovery request, perform one of following operations:

indicating, to the upper layer, a failure indication about the failure of transmitting the beam failure recovery request;

indicating, to the lower layer, a failure indication about the failure of transmitting the beam failure recovery request;

determining the failure of the beam failure recovery;

determining the failure of the radio link;

indicating, to the physical layer, the failure of the current beam failure recovery; or indicating the physical layer to provide the new candidate beam.

13. The terminal according to claim 9, wherein the new candidate beam is indicated to the MAC layer by the physical layer, or the new candidate beam is determined by the MAC layer based on at least one of evaluation or selection.

14. The terminal according to claim 9, wherein the processor is further configured to indicate the physical layer to provide a candidate beam, in a case that at least one of following conditions is met:

a condition that the MAC layer or the physical layer triggers the beam failure recovery;

a condition that the number of beam failure instances of the MAC layer or the physical layer reaches a preset number;

a condition that a failure occurs to a random access procedure initiated by the MAC layer in a random access resource corresponding to a current candidate beam;

a condition that a failure occurs to a random access preamble transmission at the MAC layer;

a condition that a failure occurs to a contention-free random access at the MAC layer; or a condition that a failure occurs to a contention-based random access at the MAC layer.

15. The terminal according to claim 9, wherein the processor is further configured to:

detect whether a beam failure recovery timer expires; and process the random access procedure in accordance with the preset processing manner, in a case that the beam failure recovery timer does not expire.

16. The terminal according to claim 9, wherein the processor is configured to:

select the beam with an optimum measurement result from the at least two candidate beams to transmit the beam failure recovery request;

select the beam with an optimum measurement result from candidate beams in the at least two candidate beams to transmit the beam failure recovery request, wherein measurement results of the candidate beams in the at least two candidate beams are better than a preset threshold;

select any one of the at least two candidate beams to transmit the beam failure recovery request;

select any one beam from candidate beams in the at least two candidate beams, to transmit the beam failure recovery request, wherein measurement results of the candidate beams in the at least two candidate beams are better than a preset threshold;

select a beam from the at least two candidate beams to transmit the beam failure recovery request, wherein a random access resource associated with the beam in the at least two candidate beams is a nearest random access resource; or select a beam from candidate beams in the at least two candidate beams whose measurement results are better than a preset threshold, to transmit the beam failure recovery request, wherein a random access resource associated with the beam from the candidate beams is a nearest random access resource.

17. A non-transient computer-readable storage medium, wherein a program is stored on the non-transient computer-readable storage medium, and the program is executed by a processor to:

process a random access procedure in accordance with a preset processing manner, when obtaining a new candidate beam during the random access procedure of transmitting a beam failure recovery request;

wherein the program is further executed by the processor to perform the following operation, before the processing the random access procedure in accordance with the preset processing manner when obtaining the new candidate beam:

before transmitting the beam failure recovery request during a beam failure recovery procedure, when obtaining at least two candidate beams, indicated by a physical layer, used to transmit the beam failure recovery request, select by a media access control (MAC) layer a beam from the at least two candidate beams to transmit the beam failure recovery request; or select by a media access control (MAC) layer some or all of the at least two candidate beams to transmit the beam failure recovery request in a predetermined order;

wherein the predetermined order comprises one of following:

a sequential order of random access resources corresponding to the at least two candidate beams;

an order of measurement results of the at least two candidate beams;

a random order;

a sequential order of random access resources corresponding to candidate beams whose measurement results are better than a preset threshold, in the at least two candidate beams;

an order of measurement results of candidate beams, wherein the measurement results of the candidate beams in the at least two candidate beams are better than a preset threshold; or a random order of measurement results of candidate beams, wherein the measurement results of the candidate beams in the at least two candidate beams are better than a preset threshold.

18. The non-transient computer-readable storage medium according to claim 17, wherein processing the random access procedure in accordance with the preset processing manner comprises one of following:

ignoring the new candidate beam, and continuing to perform the random access procedure;

terminating the random access procedure;

continuing to perform the random access procedure, and transmitting, in a next random access preamble transmitting procedure, a random access preamble in a random access resource corresponding to an original candidate beam;

terminating the random access procedure, and retransmitting the beam failure recovery request in a random access resource corresponding to the new candidate beam;

restarting the random access procedure, and transmitting a beam failure recovery request in a random access resource corresponding to the new candidate beam; or continuing to perform the random access procedure, and transmitting, in a next random access preamble transmitting procedure, a random access preamble in a random access resource corresponding to the new candidate beam.

19. The non-transient computer-readable storage medium according to claim 17, wherein the program is further executed by the processor to: after processing the random access procedure in accordance with the preset processing manner, when the random access procedure fails, perform at least one of following operations:

transmitting the beam failure recovery request in a common random access resource;

indicating, to an upper layer, a failure of the random access procedure;

indicating, to a lower layer, a failure of the random access procedure;

determining a failure of the beam failure recovery;

determining a radio link failure;

indicating, to the physical layer, a failure of a current beam failure recovery; or indicating the physical layer to provide a new candidate beam.

20. The non-transient computer-readable storage medium according to claim 17, wherein the new candidate beam is indicated to the MAC layer by the physical layer, or the new candidate beam is determined by the MAC layer based on at least one of evaluation or selection.

* * * * *